(12) United States Patent
Wittenschlaeger

(10) Patent No.: US 8,364,744 B2
(45) Date of Patent: *Jan. 29, 2013

(54) SOFTWARE APPLICATION STRIPING

(75) Inventor: Thomas Wittenschlaeger, Irvine, CA (US)

(73) Assignee: Nant Holdings IP, LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/556,263

(22) Filed: Sep. 9, 2009

(65) Prior Publication Data

US 2009/0327446 A1    Dec. 31, 2009

Related U.S. Application Data

(63) Continuation of application No. 12/337,877, filed on Dec. 18, 2008, now Pat. No. 7,603,428, which is a continuation-in-part of application No. 12/122,018, filed on May 16, 2008, now Pat. No. 7,904,602.

(60) Provisional application No. 61/079,909, filed on Jul. 11, 2008, provisional application No. 61/038,380, filed on Mar. 20, 2008, provisional application No. 61/032,656, filed on Feb. 29, 2008, provisional application No. 61/026,415, filed on Feb. 5, 2008.

(51) Int. Cl.
*G06F 15/16* (2006.01)
*G06F 15/177* (2006.01)

(52) U.S. Cl. ......... 709/201; 709/220; 709/226; 709/228

(58) Field of Classification Search .......... 709/213–216, 709/201–203, 204–207, 217, 219, 220–221, 709/227–229, 246, 200
See application file for complete search history.

(56) References Cited

U.S. PATENT DOCUMENTS

| | | | | |
|---|---|---|---|---|
| 5,887,138 | A * | 3/1999 | Hagersten et al. | 709/215 |
| 6,430,618 | B1 | 8/2002 | Karger et al. | |
| 6,775,779 | B1 * | 8/2004 | England et al. | 726/26 |
| 6,816,882 | B1 * | 11/2004 | Conner et al. | 709/203 |
| 7,174,381 | B2 * | 2/2007 | Gulko et al. | 709/226 |
| 7,257,816 | B2 * | 8/2007 | Kulp et al. | 718/104 |
| 7,334,086 | B2 * | 2/2008 | Hass et al. | 711/123 |
| 7,376,693 | B2 * | 5/2008 | Neiman et al. | 709/201 |
| 7,401,333 | B2 | 7/2008 | Vandeweerd | |
| 7,554,909 | B2 * | 6/2009 | Raghunath et al. | 370/230 |
| 2001/0039497 | A1 * | 11/2001 | Hubbard | 705/1 |
| 2002/0124137 | A1 * | 9/2002 | Ulrich et al. | 711/113 |
| 2002/0138559 | A1 * | 9/2002 | Ulrich et al. | 709/203 |
| 2004/0044906 | A1 * | 3/2004 | England et al. | 713/200 |
| 2004/0243836 | A1 * | 12/2004 | England et al. | 713/200 |
| 2007/0079081 | A1 | 4/2007 | Gladwin et al. | |
| 2008/0104367 | A1 | 5/2008 | Blumrich et al. | |

* cited by examiner

*Primary Examiner* — David Lazaro
*Assistant Examiner* — Edward Kim
(74) *Attorney, Agent, or Firm* — Fish & Associates, PC

(57) ABSTRACT

A distributed computing system comprising networking infrastructure and methods of executing an application on the distributed computing system is presented. Interconnected networking nodes offering available computing resources form a network fabric. The computing resources can be allocated from the networking nodes, including available processing cores or memory elements located on the networking nodes. A software application can be stored in a system memory comprising memory elements allocated from the nodes. The software application can be disaggregated into a plurality of executable portions that are striped across the allocated processing cores by assigning each core a portion to execute. When the cores are authenticated with respect to their portions, the cores are allowed to execute the portions by accessing the system memory over the fabric. While executing the software application, the networking nodes having the allocated cores concurrently forward packets through the fabric.

15 Claims, 6 Drawing Sheets

SOFTWARE APPLICATION STRIPING

This application is a continuation of U.S. patent application having a Ser. No. 12/337,877, filed on Dec. 18, 2008 which claims the benefit of priority to U.S. provisional application having Ser. No. 61/079,909, filed on Jul. 11, 2008, and was also a continuation-in-part of U.S. patent application having Ser. No. 12/122,018 filed on May 16, 2008, which claims priority to U.S. provisional application having Ser. No. 61/038,380 filed on Mar. 20, 2008, U.S. provisional application having Ser. No. 61/032,656 filed on Feb. 29, 2008, and U.S. provisional application having Ser. No. 61/026,415 filed on Feb. 5, 2008. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is distributed computing within a network fabric.

BACKGROUND

Distributed computing systems take on many different forms. Unfortunately, known distributed computing systems fail to offer a general computing platform that can be used by individuals in a manner where the individual software application or data remains secured.

Consider for example distributed computing systems that employ parallel processing using "public" computers. Typically, a user installs a copy of a dedicated parallel processing software application on their computer. The application accesses data on or communicates with a centralized system to crunch a data set. Such computer systems are useful for dedicated projects, especially where there are large data sets to be analyzed. However, the systems do not lend themselves to public use nor do the systems offer methods of securing an application. Example projects that use public computers for parallel processing include the search for extraterrestrial life by SETI@Home, the modeling of protein folding by Folding@Home, or the search for new, larger prime numbers by the Great Internet Mersenne Prime Search (GIMPS). These projects, other projects, or their infrastructure (e.g., BOINC offered by University of California at Berkeley; http://boinc.berkeley.edu/) fail to provide a general computing platform that is secure.

Other distributed computing platforms offer some level of security by offering a computing architecture that merely keeps an application local to the computing environment. Rather than copying a software application across multiple remote, public computers, a software application is run on multiple processors within a computer. Such systems can comprise multiple computers networked together (e.g., Beowulf clusters or based on Parallel Virtual Machine), or can comprise a single computer that incorporates multiple processors. There are numerous examples of computing architectures that provide for local computation.

One example of a distributed computing platform includes U.S. Pat. No. 5,887,138 to Hagersten et al. titled "Multiprocessing Computer System Employing Local and Global Address Spaces and COMA and NUMA Access Modes", filed on Jul. 1, 1996. Hagersten describes methods of accessing a shared memory where a physical memory location is remote to a node.

Another example includes U.S. Pat. No. 7,174,381 to Gulko et al. titled "Parallel Computing System, Method, and Architecture", filed on Dec. 4, 2002. Gulko discusses a parallel computing system where an application is execution on distributed computing resources and the execution supervised by server software.

Yet another example includes U.S. Pat. No. 7,376,693 to Neiman et al. titled "System Architecture for Distributed Computing and Method of Using the System", filed on Jun. 20, 2004. Neiman discloses that a portion of an application is executed by a local computer and other portions are executed by remote computers.

Yet still another example includes U.S. Pat. No. 7,401,333 to Vandeweerd et al. titled "Array of Parallel Programmable Processing Engines and Deterministic Method of Operating the Same", filed on Aug. 8, 2001. In the Vandeweerd approach, processing engines are interconnected via network in a system-on-a-chip solution.

Still another example includes U.S. Patent Publication 2008/104367 to Blumrick et al. titled "Collective Network for Computer Structures", filed on Jul. 18, 2005. Blumrick contemplates a network of ASIC nodes where each node can include a router device for sending packets to and from each node.

Although the above computing systems have utility in their respective environments, they still fail to address security concerns relating to an executing application. In all the above examples, and other known examples, applications executing on the computing system remain localized or are subject to compromise. The computing system might be able to protect data via encryption of other known techniques; however, the computing systems fail to adequately protect an executing application. Should a computer or computing facility become comprised, the application itself can be accessed from the computer system memory and deconstructed. Ideally, a distributed computing system would protect a software application during execution while also offering a general computing platform accessible to the public.

It has yet to be appreciated that a general purpose distributed computing platform can be formed by allocating resources from networking infrastructure. Latent processors or latent cores on processors located in networking infrastructure can be combined with a system memory allocated from unused memory in the infrastructure to form a parallel computing engine. A software application can be deployed in a secure fashion by encrypting the application data or by distributing portions of the application across the nodes of the networking infrastructure. Furthermore, the portions of the application can be striped across the networking nodes to ensure that no one node has a complete copy of the application.

Thus, there is still a need for ways to leverage latency computing capabilities to for a distributed computing platform and to execute a software application on the platform.

SUMMARY OF THE INVENTION

The present invention provides apparatus, systems and methods in which a software application can be executed on a network fabric where portions of the software application are assigned to different processing cores. One aspect of the inventive subject matter is a method for forming a distributed computing platform from processing cores located in different networking nodes. The method can include providing a network fabric of interconnected networking nodes. Preferably, each networking node comprises a memory element for use by the software application and a multi-core processor. Resources from the network fabric, including memory elements or processing cores, can be allocated for use by the software application. A system memory can be established from the memory elements where the system memory is preferably spread across networking nodes of the fabric. The allocated processing cores can address the system memory over the fabric to access the software instructions stored in the system memory. In a preferred embodiment, the software application is disaggregated into a plurality of executable portions where the portions are striped across the processing cores according to a secured function. Each core can be allowed to access their respective portions and execute the portions from the system memory. While the processing cores of the networking nodes execute the software application, the networking nodes having the cores continue to operate as a networking fabric.

The portions of a software application can also be assigned to processing cores to increase redundancy or fault tolerance of the application. In some embodiments, a processing core executes more than two, three, or even more different portions of the application. Additionally, two different processing cores could be assigned the identical application portions in a mirrored configuration. Should one of the processing cores fail, the other could take over, possibly by being activated from a stand-by state. In yet other embodiments having redundant portions, the portions that are not coextensive can still have overlapping code segments.

Various objects, features, aspects and advantages of the inventive subject matter will become more apparent from the following detailed description of preferred embodiments, along with the accompanying drawings in which like numerals represent like components.

DETAILED DESCRIPTION

Figure 1:
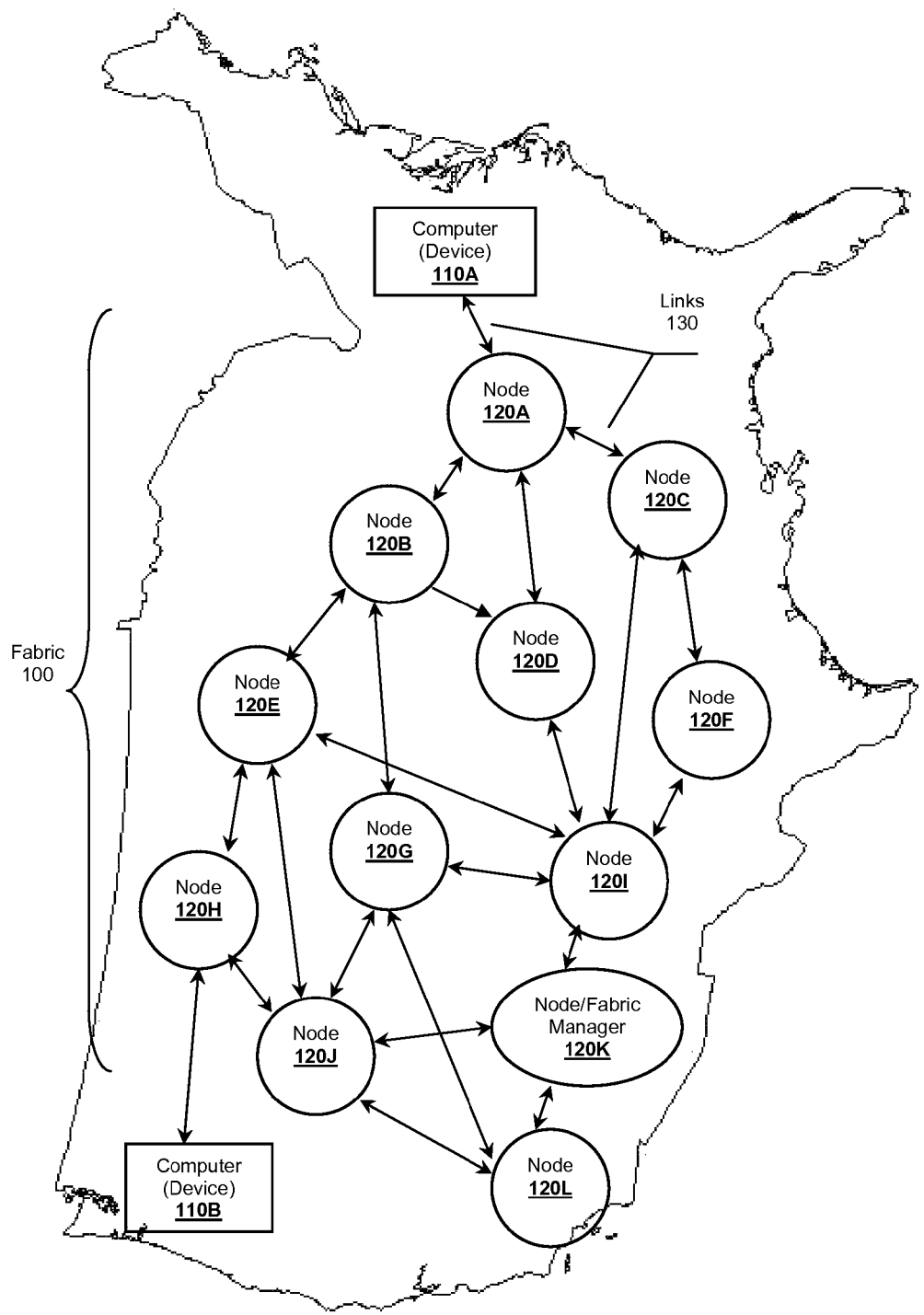
FIG. 1 is a schematic of a networking fabric of interconnected networking nodes.

In FIG. 1, network fabric 100 comprises a plurality of interconnected networking nodes 120. Fabric 100 represents networking infrastructure, preferably a packet switched network, allowing computer 110A to communicate with computer 110B over geographically significant distances. Nodes 120 interconnect with each other via physical communication links 130.

Fabric 100 can comprise various forms of networking infrastructure nodes 120 including routers, switches, gateways, access points, repeaters, or other networking equipment that route or forward packets. Fabric 100 can be a public network (e.g., the Internet) or a private network (e.g., LAN, VLAN, intranet, etc. . . . ). An example of a private network can include a corporate network where nodes 120, computer 110A, and 110B are members of a VLAN.

Preferred links 130 comprise optic fibers supporting multiple data channels where each data channel operates at its own wavelength. Especially preferred links 130 include optic fiber links capable of transporting data over geographically significant distances. For example, a single mode optic fiber can support transmission of data over a distance of up to 40 Km at a wavelength of 1550 nanometers (nm) with a throughput of 10 Gbps. An additional example of a fiber optic link includes those under development by the IEEE 802.3 Higher Speed Study Group. The contemplated fibers support bandwidths from 40 Gbps to 100 Gbps over distances up to 40 Km using a single mode optical fiber.

Preferred links 130 allow for communications across the fabric with low latencies of less than 100 microseconds, or more preferably with a latency of less than 10 microseconds.

In a preferred embodiment, nodes 120 comprise network switches interconnected via optical fiber links 130. Suitable equipment that can be used to form fabric 100 includes switches (e.g., the Raptor ER-1010) or network products by Raptor™ Networks Technology, Inc. Raptor switches or other network products provide an acceptable platform for using a distributed computing environment due to their support for high data rate (e.g., at least 10 Gpbs) and low latency (e.g., less than 10 microseconds) communications among nodes 120 or computers 110A and 110B. Furthermore, Raptor products can also support communications over geographically significant distances. In a preferred embodiment, nodes 120 can be separated by at least one kilometer. In other embodiments, the nodes 120 can be physically separated by more than 10 kilometers, or even more than 100 kilometers. It is also contemplated that switches or other networking products available from other vendors can be adapted to support the inventive subject matter. Additional contemplated vendors include Juniper™ Networks, Inc. of Sunnyvale, Calif., or Cisco™ Systems, Inc. of San Jose, Calif.

One skilled in the art of computing architectures will appreciate that a network fabric 100 operating at high data rates and low latency has similar characteristics of a computer bus. For example, a fabric 100 based on Raptor switches supporting 10 Gpbs and low latency has similar performance characteristics to a front side bus having a 32-bit width and operating at 100 MHz. Such a front side bus can sustain a data transfer rate of 1600 MB/s (12.8 Gbps) with low latency.

In a preferred embodiment, fabric 100 forms a computing bus among nodes 120. Fabric manager 120K can form a bus topology among nodes 120 and links 130 that allows processing cores within nodes 120 to access a distributed system memory spread among the nodes 120. Copending U.S. patent application having Ser. No. 12/122,018 titled "Distributed Computing Bus" filed on May 16, 2008, discloses forming a computing bus among networking nodes in a network fabric. When fabric 100 is configured as a computing bus, unused computing resources associated with nodes 120 can be allocated for general purpose computing and accessed via the bus.

Figure 2:
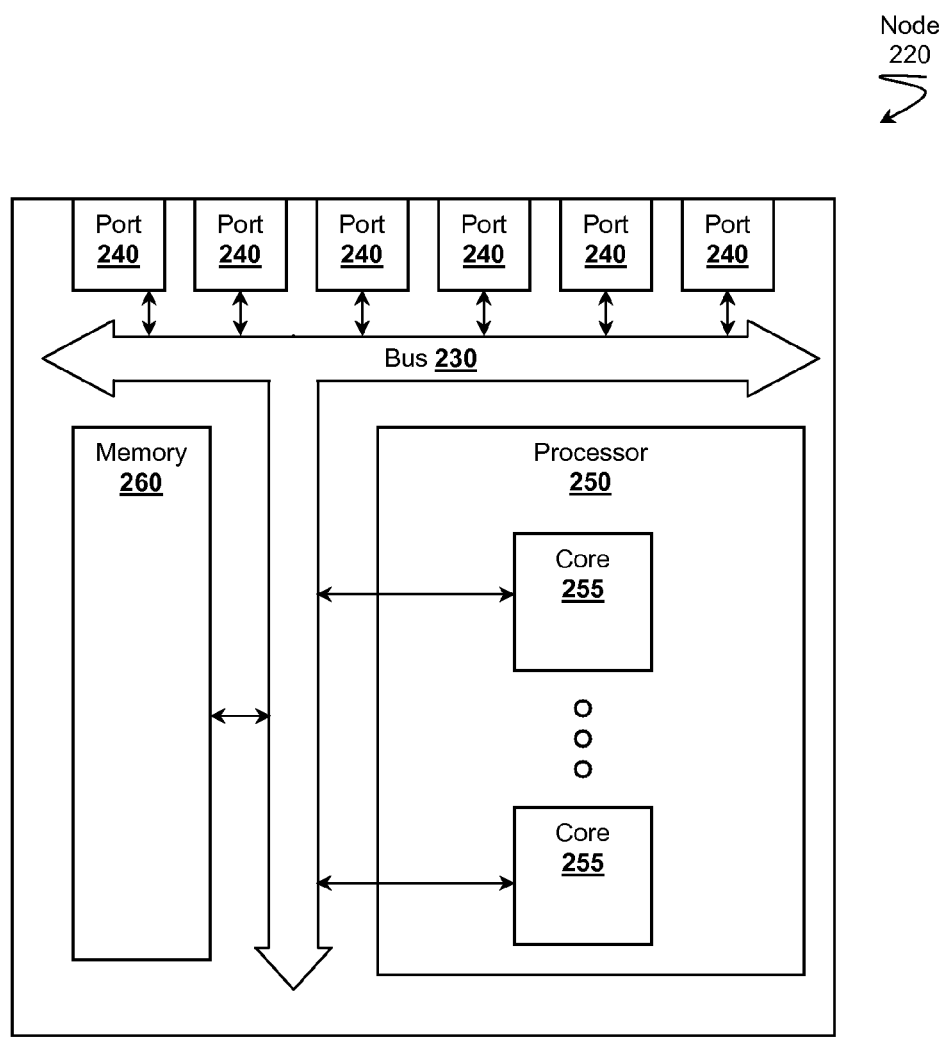
FIG. 2 is a schematic of a networking node having ports, memory, and a multi-core processor.

In FIG. 2, network node 220 comprises ports 240, multi-core processor 250, and memory 260. Ports 240, memory 260, and processor 250 communication among each other via internal bus 230. One skilled in the art will appreciate that node 220 can represent a computing device that can be easily constructed using known techniques. In a preferred embodiment, node 220 comprises a housing in which are disposed exposed ports 240, memory 260, and processor 250.

In a preferred embodiment, node 220 comprises a plurality of ports 240 used to interconnect with other nodes 220 or other network enabled devices. In a preferred embodiment, ports 240 comprise connectors for optic fiber links. In other embodiments, ports 240 could include wired connectors or wireless connectors as desired to construct a network fabric.

Processor 250 comprises a multi-core processor having a plurality of processing cores 255. In a preferred embodiment, processor 250 comprises at least two cores 255, more preferably at least four cores 255, and yet more preferably at least 16 cores 255. Example multi-core processors that can be used within networking node 220 include the Intel™ Core 2 Duo (two cores), the Intel Core 2 Quad (four cores), the Freescale™ MSC8144 (four cores), or even the Intel Polaris teraflop research chip (80 cores). Cores 255 preferably include general purpose computing engines capable of accessing memory 260 for software instructions or for reading or writing computer data. A preferred processor 250 also includes additional modules including Ethernet controllers, memory controllers, DMA controllers, DUARTs, or other controllers. In an especially preferred embodiment, processor 250 also includes a security engine that supports one or more encryption or cipher algorithms. Contemplated algorithms can include DES, 3DES, AES, ECC, PGP, ARC-4, MD-5, SHA-1, key exchange support, or other cryptographic protocols or algorithms.

One skilled in the art might be surprised at the concept of adding additional cores 255 to a networking device that is already sufficiently capable of operating as a networking node 220 with little or no effort. Adding cores 255 would ordinarily raise the manufacturing cost or purchase price of the device. An excess number of cores 255 beyond those required for general data transport provide for establishing a general purpose computing platform where excess cores 255 can be allocated for executing software instructions for applications beyond those of network node 220.

It is also contemplated that processor 250 can comprise a configurable core 255. For example, core 255 can include one or more field programmable gate arrays (FPGA) or a complex programmable logic device (CPLD) where the hardware of core 255 itself can be programmed. Rather than merely executing instructions stored in memory 260, core 255 can be reconfigured via a hardware definition language (e.g., VHDL, SystemC, etc . . . ) stored in memory 260 or obtained external to node 220. Configurable cores allows for adapting core 255 to different sets of executable instructions.

Memory 260 can include volatile data storage or non-volatile data storage. Examples of volatile memory include RAM, DRAM, or other types of memory. Examples of non-volatile memory include Flash, ROM, NRAM, disk storage, SSD, or other memory that allows data to persist across power cycling. Memory 260 comprises sufficient storage capacity for storing software instructions for node 220 to operate as a networking node as well storing packets in buffers during transport. Additionally, memory 260 preferably comprises sufficient excess storage that can be utilized for general computing purposes.

Figure 3:
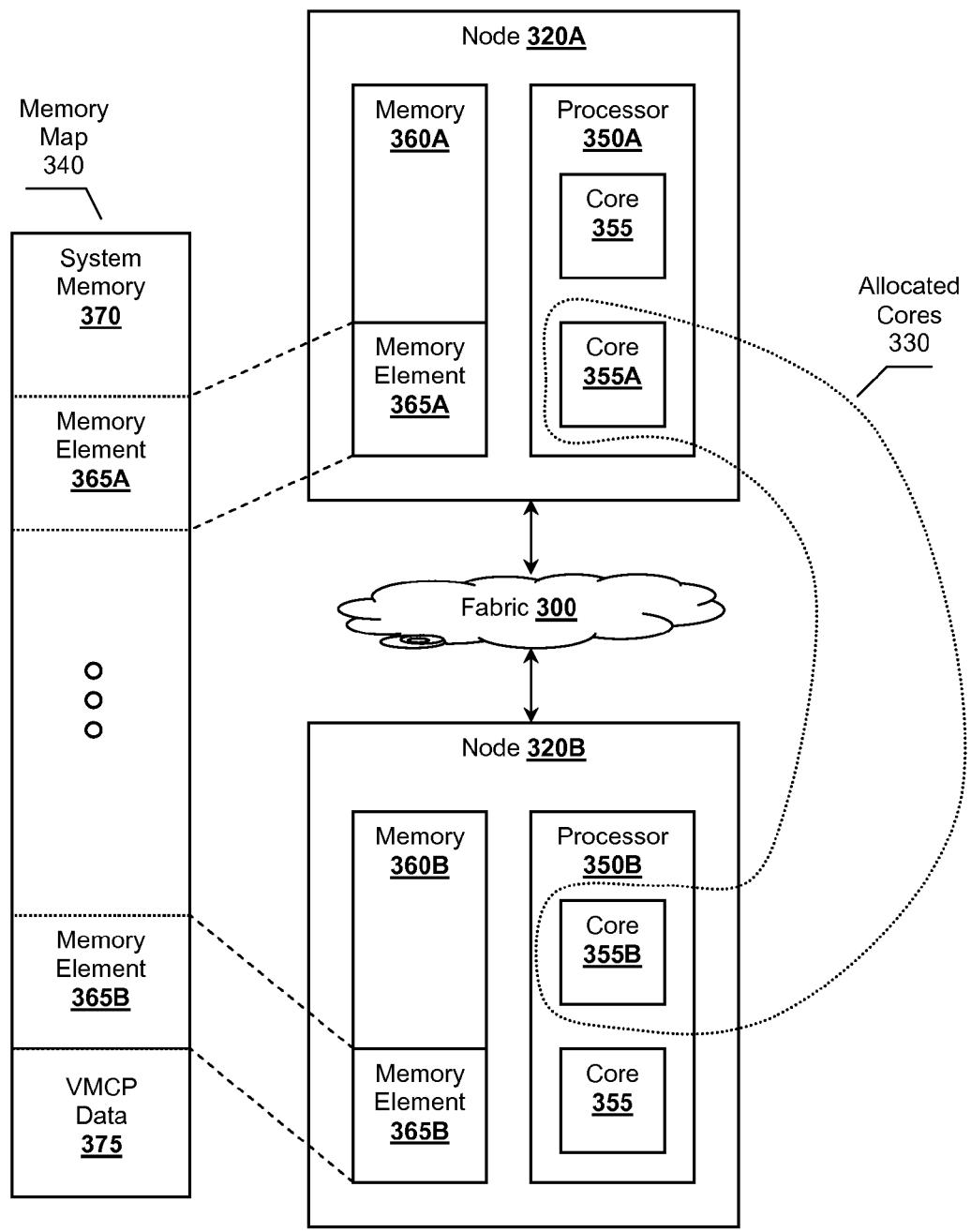
FIG. 3 is a representation of a system memory allocated from memory elements of networking nodes and of allocated processing cores.

In FIG. 3, a general purpose computing system is being constructed by allocating resources from networking nodes 320A through 320B, collectively referred to as nodes 320. For example, system memory 370 includes a plurality of allocated memory elements including elements 365A and 365B, collectively referred to as elements 365. Allocated cores 330 comprise a plurality of allocated cores including cores 355A and 355B, collectively referred to as cores 355. Although system memory 370 and allocated cores 330 are illustrated as having a small number of individual components, it should be apparent to one skilled in the art that any number of components can be allocated.

System memory 370 represents a virtual memory that is aggregated from various memory elements 365 of memories 360 in network nodes 320. In a preferred embodiment, system memory 370 is spread over physically separated, different network nodes 320A and 320B as shown in FIG. 3. In some embodiments, memory elements 365A and 365B can be separated by geographically significant distances greater than one kilometer, greater than 10 kilometers, or even greater than 100 kilometers. Spreading system memory 370 over physically separated devices enhances the security of a data stored within memory 370, including application software stored in memory 370, because an attacker would require physical access to all nodes 320 to gain access to the complete data set stored in memory 370. Such an attack would be impractical, especially when nodes 320 are separated by hundreds or thousands of kilometers. It is also contemplated that that system memory 370 could be entirely located within node 320A as opposed to being spread among multiple nodes 320 when desirable.

System memory 370 can be addressed through the use of memory map 340 that provides a translation from a virtual memory location to a physical memory location within the network fabric. When system memory 370 is allocated from memory elements 365, memory map 340 is established and disseminated to networking nodes 320. As allocated cores 330 access data or execute instructions stored in memory 370, processors 350 intercept memory accesses and use memory map 340 to direct the memory access to the appropriate node 320A, if necessary. For example, nodes 320 can utilize RDMA to access remote memory locations. Memory map 340 preferably coverts a memory location into a node identifier of and a memory address (e.g., real or virtual) within a node 320. The node identifier can includes a MAC address, IP address, or other network address. Acceptable node identifiers can also includes UUIDs, GUIDs, or other identifiers. Although a preferred embodiment utilizes a memory map, other suitable methods for accessing system memory 370 exist. For example, U.S. Pat. No. 5,887,138 to Hagersten et al. titled "Multiprocessing Computer System Employing Local and Global Address Spaces and COMA and NUMA Access Modes", discusses various suitable methods of accessing memory in a distributed computing environment. Another example for managing or accessing a shared memory that can be adapted for the inventive subject matter includes U.S. Patent Publication 2006/0155792 to Inoue et al. titled "Methods and Apparatus for Managing a Shared Memory in a Multi-Processor System" filed on Jan. 7, 2005.

Allocated cores 330 can be considered a virtual multi-core processor (VMCP) comprising two or more of cores 355A or 355B, preferably located on physically separated nodes 320. The VMCP can be bound together through software resident on nodes 320 and stored within memories 360A or 360B. System memory 370 can also store VMCP data 375 associated with maintaining the integrity of the VMCP that is accessible by nodes 320A or 320B as well as the various cores of allocated cores 330. Example VMCP data includes registers, flags, instruction pointers, global cache, thread or process context data, or other data for simulating a VMCP.

In some embodiments, the allocation of computing resources can occur as a function of a secured function. As used herein "secured function" is used euphemistically to refer to a secret function, preferably secured via a secret key. Upon a request for computing resources, the resources can be selected from available resources according to random function using the secret key as a seed. In such an approach, the location of memory elements 365 or cores 355 can not be determined prior, which further enhances the security of the system.

Resources can be allocated by a requestor, a fabric manager, or other entity associated with the system. A requester can include an edge computer running a general purpose operating system, including, for example, a personal computer that includes a software application designed to interface with fabric 300 or nodes 320. The requester can discover available resources within fabric 300 and then allocate resources from those that are available and respond to a discovery request. Any suitable discovery methods can be used including an SSDP message, a multicast message, a broadcast message, or other from of message sent to the nodes 320 of fabric 300. The requester could also connect to a fabric manager or other resource administrator to obtain a necessary resource. The fabric manager can provide a list of allocated resources to the requestor. In such an embodiment, the fabric manager can maintain the list of available resources as part of its management operation to maintain fabric 300.

Figure 4:
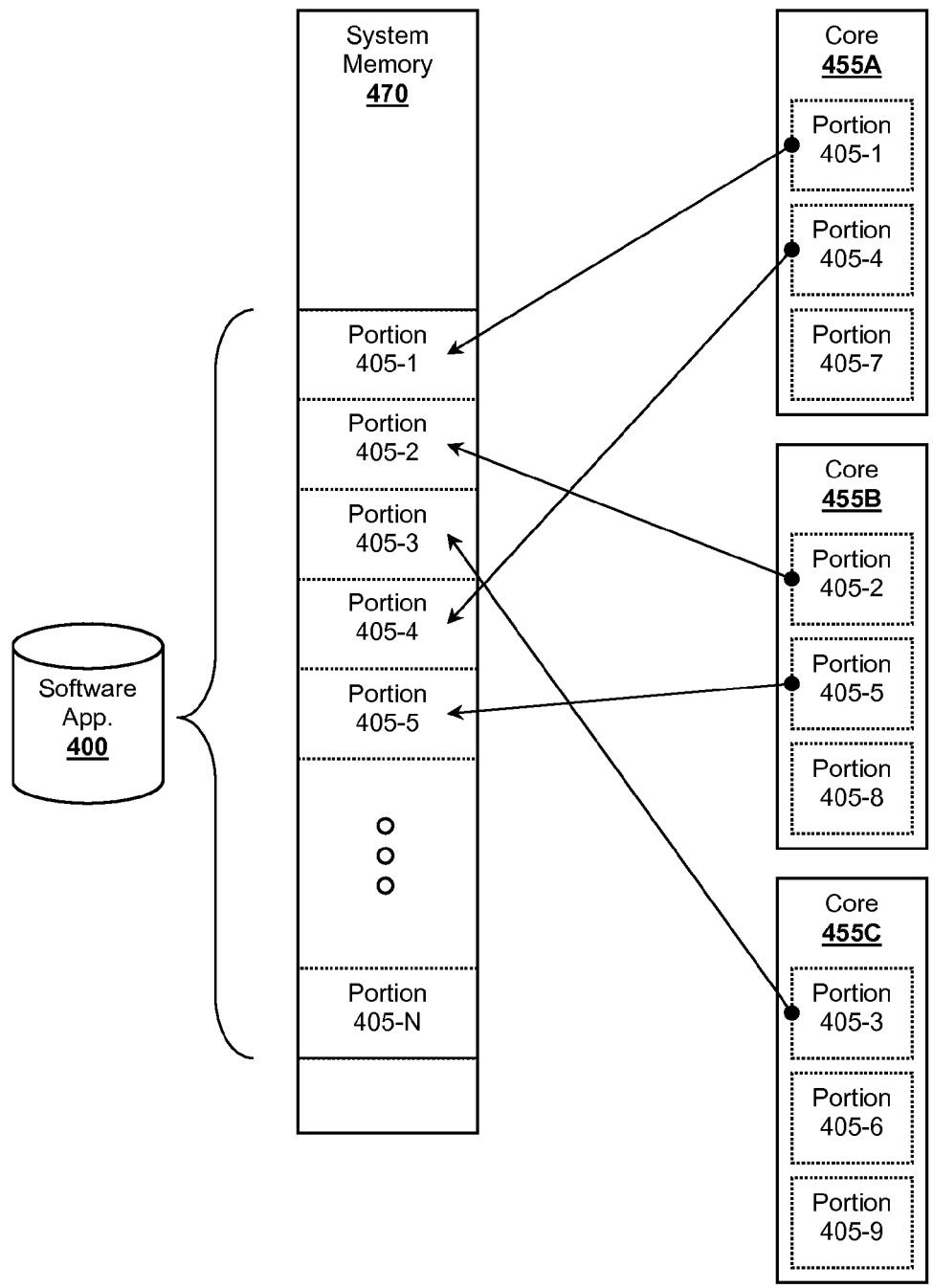
FIG. 4 is a schematic of a software application stored in a system memory where the application has portions assigned to various allocated processing cores.

In FIG. 4, software application 400 is stored in system memory 470, preferably where portions 405 of application are stored on memory elements located on different networking nodes. Application 400 could be stored within a single networking node's memory or, more preferably, in a manner where application 400 is spread across more than one node. In a preferred embodiment, application 400 is disaggregated into a plurality of executable portions 405-1 through 405-N, collectively referred to as portions 405. It should be noted that executable portions 405 can be segregated physically by placing the portions on physically different networking nodes or, more preferably, segregated logically where the boundaries merely define where one portion ends and another begins.

Software application 400 should be broadly considered to include necessary instructions for a software application to run. Software application 400 includes the application code itself, and can also include portions of an operating system, library modules, or other instructions in support for running application 400. Application 400 is considered to include commercially available applications as well as proprietary applications. Examples of commercially available applications include office productivity software, game software, accounting software, database software, or other applications that an individual can purchase or use.

Executable portions 405 preferably include software instructions that are executable by the allocated cores 455A through 455C, collectively referred to as cores 455. In a preferred embodiment, portions 405 include software instructions comprising machine code that is directly executable by cores 455. In other embodiments, portions 405 include software instructions comprising intermediary code. Example intermediary code includes bytecodes (e.g., Java bytecodes, Microsoft's common intermediate language instructions, etc . . . ), assembly language instructions, or other intermediary codes. An embodiment supporting intermediary codes can execute the codes by providing a runtime or virtual machine that executes on cores 455. It is also contemplated that portions 405 can include software instructions based on high-level languages. Example high-level languages include C, C#, Python, Perl, Java, or other known or yet to be invented programming languages. When portions 405 comprise high level language, cores 405 can execute the software by running an interpreter, or possibly a compiler, for the respective languages. One suitable means for disaggregating software application 400 into portions 405 includes U.S. Pat. No. 7,174,381 to Gulko et al. titled "Parallel Computing System, Method, and Architecture".

Portions 405 are preferably assigned to allocated cores 455 for execution in a striped manner. For example, core 455A can be assigned portion 405-1, core 455B can be assigned next portion 405-2, core 455C can be assigned portion 405-3, and then back again to 455A.

An astute reader will recognize the striping of application 400 across cores 455 is similar to data striping often employed network storage solution. Data striping is often referred to as redundant array of inexpensive disks level 0 (RAID-0). In the case of the inventive subject matter, it should be noted that the responsibility for executing each portion 405 is striped without requiring actual portions 405 to be physically placed local to cores 455. It is contemplated that in some embodiments cores 455 could store instructions of the portions in a local cache for execution to increase performance. However, local caching is not required. In a preferred embodiment, the local cache can part of core 455. In other embodiments, the local cache can merely be memory within the node having core 455.

Portions 405 can represents a functional portion of software application 400. Application 400 can be disaggregated into processes, threads, tasks, modules, functions, or other appropriate sections of application 400. In a preferred embodiment, application 400 can be automatically analyzed to determine appropriate boundaries for portions 405 should be set. For example, the object file(s) corresponding to the application can be analyzed to search for areas of the code that are moderately self-contained. It should also be noted that portions 405 could be of uniform size, or more preferably non-uniform size. As application 400 is automatically analyzed, the portions 405 are likely to be defined based on natural boundaries (e.g., entry points of a function or routine) that cause portion 405 to have non-uniform sizes.

In a preferred embodiment, portions 405 are striped across cores 455 by assigning portions 405 according to a secured function. A secured function can include a pseudo random number generator whose seed represents a secret key. Such an approach aids in protecting application 400 by decentralizing its execution among many physically separated nodes. Furthermore, the locations of the nodes would likely be unknown a priori. For example, a requester wishing to run application 400 could request computing resources. The requester inputs a secret key. The key can then be used to randomly select which portions are assigned to which cores 455. It should be noted, that the cores 455 could be a subset of those available. Other factors can also be used to determine core assignments including fabric congestion, load balancing among nodes or cores, locality of a core to memory where portion resides, number of hops between cores, or other computation or fabric related metrics. The secured function can also depend on various processing or network metric other than the secret key. Examples of suitable methods of assigned tasks to processors based on processing values are described in U.S. Pat. No. 7,392,511 to Brokenshire et al. titled. "Dynamically Partitioning Processing Across Plurality of Heterogeneous Processors" filed Sep. 25, 2003.

System memory 470 also preferably stores additional data associated with application 400 beyond executable portions 405 that correspond to code segments of the application 400. The additional data can include application header information, data segments, metadata, or other information.

In some embodiments, system memory 470 also stores authentication information with respect to cores 455. As cores 455 access system memory 470, the cores can authenticate themselves using secret keys or tokens as is well known in the art. Additional, cores 455 can establish secure sessions using secured portions that establish a secured communication session with remote nodes having the physical memory elements where portions 405 reside.

It is also contemplated that application 400 can be encrypted within system memory 470 to further decrease the risk of attack. Portions 405 can be collectively encrypted or individually encrypted using the same or different keys known only to their respective cores 455. Once a core 455 is authenticated or appropriate keys are exchanged, core 455 can access or decrypt portions 405 as necessary. Acceptable methods that could be adapted for deploying or retrieving encrypted applications include U.S. Patent Publication 2008/0065907 to Nutter et al. titled "System and Method for Securely Restoring a Program Context from a Shared Memory" filed on Sep. 12, 2006, and U.S. Patent Publication 2008/0066074 also to Nutter et al. titled "System and Method for Securely Saving a Program Context to a Shared Memory" also filed on Sep. 12, 2006.

Figure 5A:
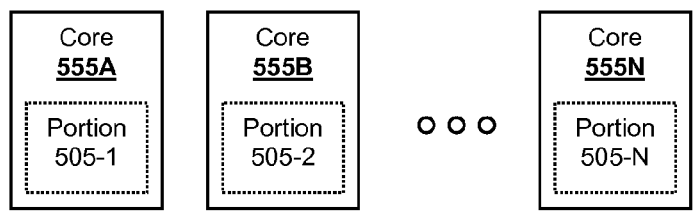
FIG. 5A is an illustration of striping portions across allocated processing cores.
Figure 5B:
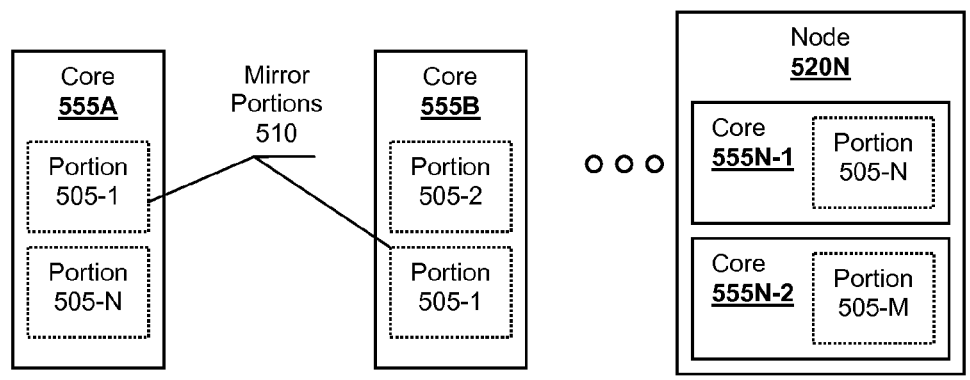
FIG. 5B is an illustration of striping portions across allocated processing cores where each portion is mirrored.
Figure 5C:
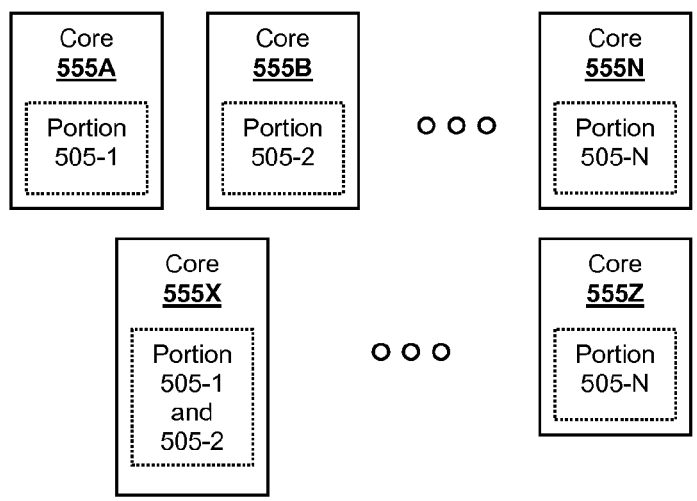
FIG. 5C is an illustration of a redundant portions striped across different cores where each core has a single portion.

FIGS. 5A, 5B, and 5C illustrate various forms of striping a software application by assigning executable portions 505-1 through 505-Z of the application across cores 555-A through 555-Z. The following examples present different forms of application striping. However, it is also contemplated that other form can also be used, all of which fall within the scope of the inventive subject matter. Contemplated forms of striping include assigning two different portions to cores on the same networking node, or even three or more portions to the same networking node.

FIG. 5A illustrates a basic form of application striping where a software application is striped across cores 555A through 555N by assigning a single one of executable portion 505-1 through 505-N, collectively referred to as portions 505, to each of cores 555. In a preferred embodiment, cores 555 are physically separated from each other by geographically significant distances. Such an approach of application striping provides for secure execution of the software application as the application is executed in a decentralized fashion. However, the approach lacks fault tolerance.

FIG. 5B illustrates a form of application striping that offers greater fault tolerance. Each of cores 555 has been assigned two or more portions 505 where two different cores have responsibility for the same portion. For example, core 555A has been assigned portions 505-1 and 505-N, core 555B has been assigned 505-2 and 505-1, and so on. Cores 555A and 555B both have been assigned portion 505-1 to provide for fault tolerance. Portion 505-1 on core 555A and portion 505-1 on core 555B represent mirrored portion 510. Should one of the cores fail or loose connectivity with the system memory or rest of the system, the remaining core can be activated to execute the portion to cover for the fault. A fabric manager or requester can monitor the resources used for executing the software application. When a resource is lost, the manager or requester can activate the redundant resource. In some embodiments, a single networking node 520N could execute two, three, or more different portions 505 where each different portion 505 is executed by a different core 555N-1 through 555N-2 within the node.

Mirrored portions 510 preferably comprise substantially identical portions 505 of a software application. One skilled in the art of data storage systems will appreciate that mirrored portions 510 are similar to partition or disk mirroring (e.g., RAID-1) in data storage systems. Additionally, it should be noted that the application striping configuration presented in FIG. 5B is similar in structure to a RAID-10 data storage configuration.

It should be noted that the configuration of FIG. 5B illustrates an embodiment where one could have two instances of a software application concurrently executing. As core 555A executes portion 505-1, core 555B could also execute portion 505-1, assuming resource access conflicts are properly resolved. In some embodiments, the system memory can store two separate instances of the software application to allow for simultaneous execution without conflict.

Other forms of redundant application striping are illustrated in FIG. 5C. Rather than assigning multiple portions 505 to a single core 555 as in FIG. 5B, portions 505 can be assigned to completely different cores 555 where each core has its own portion. Such an approach ensures that a core does not encounter a conflict between executing different portions. It should also be noted that redundant portions do not have to be coextensive, or the redundant portions can be different while comprising overlapping code segments. For example, core 555X is executing a portion that is combined portions 505-1 and 505-2. Each redundant instance of a software application could be partitioned in a different manner.

Portions 505 can be executed serially or in parallel, depending on the desires of the requestor wishing to execute the software application. Serial execution includes a single core 555 executing a part of its portion 505 at a time. When the need arises, possibly due to reaching the end of a portion or reaching a branch point, a core 555 can hand off execution to another core 555. Parallel execution includes two or more cores 555 executing their parts of their portions 505. Parallel execution can occur in a software application having redundant portion or can occur in a software application having threads that run in parallel.

Figure 6:
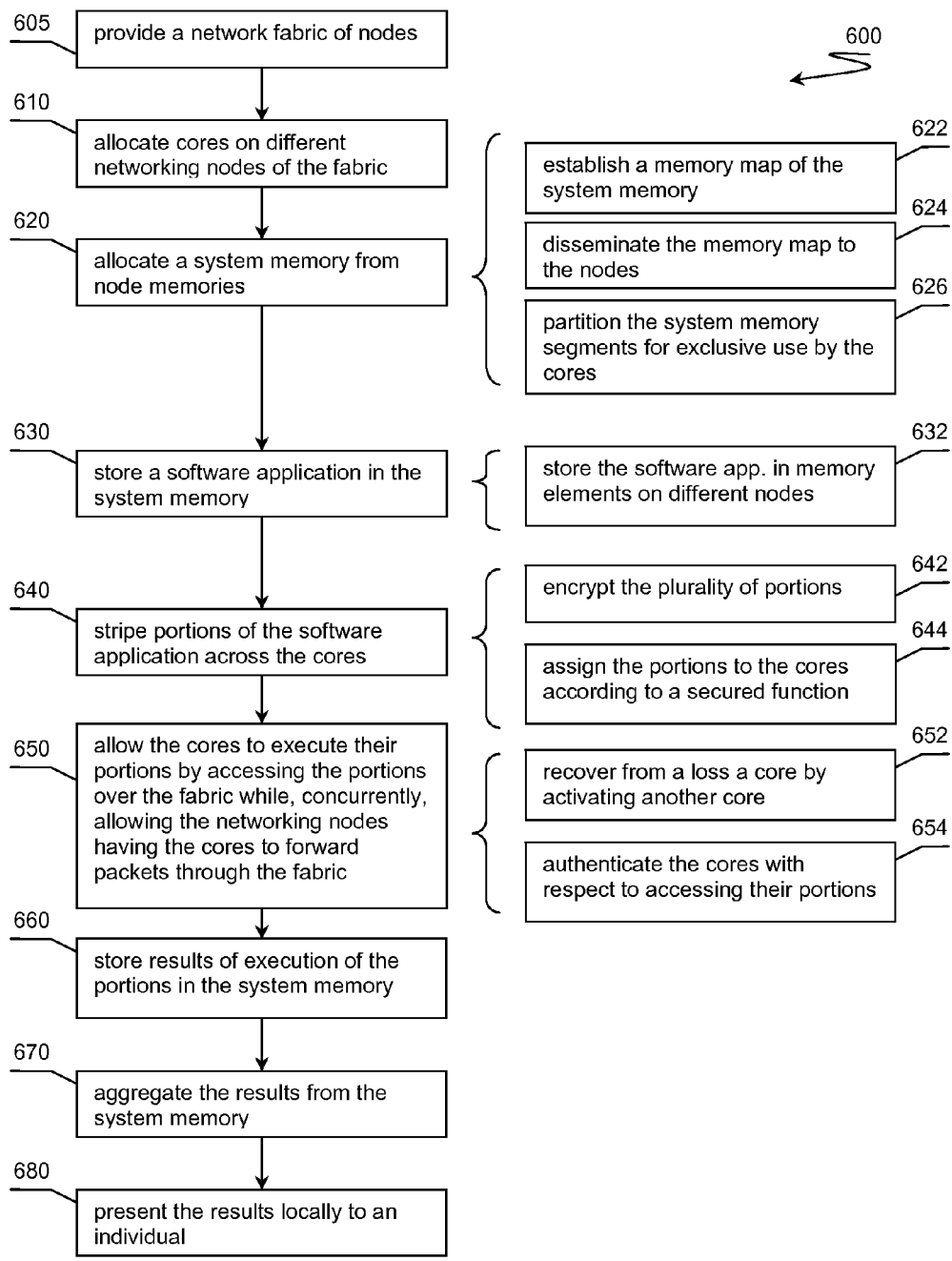
FIG. 6 is a schematic of a method for executing an application on a network fabric.

FIG. 6 illustrates method 600 of configuring a network fabric to execute a software application. At step 605 a network fabric is provided that preferably comprises a plurality of interconnected networking nodes. Preferably, each network node includes a memory element (e.g., RAM, SRAM, DRAM, Flash, etc . . . ) and a multi-core processor. In a preferred embodiment, at least one of the cores of the multi-core processor executes instructions to cause the node to continue in its capacity as a networking device forwarding or routing packets. Preferred network nodes include layer two network switches operating at the link layer of the OSI communication stack model. The memory elements and unutilized cores of the networking nodes represent available computing resources that can be allocated for general computation.

The computing resources provided by the network fabric can be allocated to execute a software application. A requester can query the fabric to determine which resources are available for use. The query can be directed to the fabric in general, possibly by a discovery request, or can be directed to a fabric manager. In response to the query, a pool of available resources is returned. Resources desired for executing the software application can be allocated from the pool. In a preferred embodiment, allocated resources are located on different networking nodes to provide a secure, decentralized computing system. At step 610 processing cores are allocated on different networking nodes. At step 620 a system memory is allocated from the memory elements on the nodes where the system memory is addressable by the allocated cores. Other computing resources can also be allocated including data storage (e.g., disk partitions), displays, peripherals, communication channels, or other computing resources.

Computing resources can be allocated via one or more interfaces. The interfaces can include a human interface, possibly a web page or a management application, that displays available resources. A user can manually select the desired resource to execute their software application. Other interfaces include machine interfaces, possibly an API, through which a computer system can allocate resources. In a preferred embodiment, operating systems for computers are adapted to acquire resources from the network fabric to extend the computing capabilities of the operating system. For example, the operating system can form a VMCP from the available resources.

At step 622 a memory map of the system memory is established. The memory map allows network nodes to convert memory addresses to physical memory addresses located on other networking nodes throughout the fabric. The memory is preferably disseminated to networking nodes having the allocated processing cores at step 624.

In some embodiments, at step 626 the system memory is partitioned into segments for the exclusive use of the allocated processing cores. Partitioning the system memory allows processing cores to access memory without conflicts. For example, if two processing cores are executing mirrored portions of the software application at the same time, the two processing cores can use their respective exclusive memory segments without encountering conflicts.

At step 630 the software application is stored in the system memory. In some embodiments, the application can be stored in a memory element of a single networking node. In more preferred embodiments, the application is stored across in memory elements of the system memory where the elements are located on different networking node at step 632. Such an approach provides for securely deploying the software application by ensuring that its data is stored in a decentralized fashion. It is also contemplated that more than one instance of the software application can be stored within a system memory in support of fault tolerance. It is contemplated that the allocated processing cores can access instructions of the software application from the system memory and can store the instructions in a local cache for improved execution performance.

The software application can be disaggregated into executable portions that can be striped across the allocated cores at step 640. In a preferred embodiment, the executable portions of the software application are striped across the cores by assigning the portion to each core according to a secured function at step 644. Utilizing a secured function reduces the risk of an external entity from determining the deployment of the software application a priori. Additionally, at step 642 the portion of the application can be encrypted according to cipher algorithm using a secure key known to the processing cores that are assigned the portions.

At step 650 the allocated processing cores are allowed to execute their respective portions by accessing the portions from the system memory over the fabric. In a preferred embodiment, through the execution of networking software on other cores, the networking nodes having the allocated processing cores are allowed to concurrently forward packets from one device external to the fabric through the fabric to another device external to the fabric. The processing cores can execute their respective portions by storing instructions of the portions in a local cache for improved performance. At step 654, a processing core is allowed to execute its portion of the application by first being authenticated or authorized. A processing core can be authenticated using well known techniques or variants including key exchange, OpenID, Kerberos, RAIDUS, SecureID, or other authentication methods.

In embodiments having executable redundant or mirrored portions, at step 652 a loss of connectivity of an allocated processing core executing the redundant portion can be recovered by activating another processing core assigned the same redundant portion. A lost processing core can be detected by monitoring the allocated resources via a heartbeat of the corresponding network nodes or each resource itself.

At step 660, the processing cores store data or other results in the system memory. In a preferred embodiment, a networking node having the processing core consults the memory map of the system memory to determine if the data should be stored locally in the networking node's memory element or if the data should be stored in the system memory by sending the data over the fabric to another networking node.

At step 670 the data resulting from executing the software application can be aggregated. In some embodiments, the results are aggregated in real-time by accessing the system memory. For example, if an application is processing data for visual presentation (e.g., a game), the visual data can be accessed from the system memory while the application is still running and presented on a display. In other embodiments, the data can be accessed once the application has prepared a final result. Preferably at step 680 the aggregated results are presented to locally to an individual. The aggregated results can be presented graphically via a display, as a data file on a disk, or other presentations.

The contemplated distributed computing system offers several clear advantages. One advantage includes that a general purpose computing system can be allocated from latent resources available within a general purpose networking fabric. Such system allows for scaling the computing power of existing computer system. Another advantage includes securing the execution of a software application by decentralizing the application data as well as decentralizing the execution of the application.

One might consider a distributed computing system leveraging computing resources from a network fabric to be inefficient. In a preferred embodiment, the computing fabric offers low latency communications among network nodes as well as resources where data can be exchanged in microseconds. For example, when the fabric is a distributed core fabric comprises cut-through switches, the fabric lacks the overhead of protocol processing that would ordinarily be encountered thereby ensuring low latency. Furthermore, the fabric can provide for massive bulk data transport one element of the system memory to another element of the system. Although the system would not likely offer the performance of a dedicated high performance computing platform, it offers sufficient performance for more general purpose applications including office productivity software, games, databases, or other applications.

Although a preferred embodiment comprises a homogenous mix of network nodes (e.g., all Raptor ER-1010 switches) having similar processing cores, it is also contemplated that a heterogeneous mix of network nodes is used. The networking nodes can include different types of networking equipment, or can include different processor architectures. In embodiments utilizing different processors, it is contemplated that the inventive subject matter can be realized through the use of a virtual runtime that executes intermediary language instructions, possibly byte codes. The runtime environment can then translate the instruction to the native format the processors or the processor cores. Example runtimes having intermediary instructions include .NET, Java, or other environments. It is also contemplated that a portion of a software application could be converted to a native language executable by the processor or cores of a networking node. In yet other embodiments where a core comprises a FPGA, the core itself can be modified via a hardware definition language (e.g., VHDL, SystemC, etc . . . ).

An example of use of the contemplated computing system includes executing software applications in scenarios requiring heightened security, possibly an embassy. An embassy must keep various classified digital data, which includes application data, secured against external threat. By utilizing the contemplated distributed computing system and methods, a software application run by the embassy can be run among networking nodes located in other secure facilities throughout the world including other embassies. Should an embassy become compromised, only a portion of the executing application might be at risk as opposed to a complete application.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A distributed computing platform, comprising:
   a plurality of interconnected networking switches forming a general data transport network between a first and second different device, each switch having a memory element and a multi-core processor;
   a first processing core from a first switch of the networking switches and a second processing core from a second different switch of the networking switches;
   a system memory comprising allocated memory elements from at least two of the switches where the system memory is addressable by the first and the second processing cores, and storing a software application; and
   wherein executable portions of the software application are securely striped across the first and the second processing cores by distributing the executable portions to the cores in the different switches according to a secret distribution function secured via a secret key, where the secret distribution function governs placement of the executable portions on the cores in a manner that appear random.

2. The platform of claim 1, further comprising a cache local to the first processing core and storing instructions of a first executable portion of the executable portions.

3. The platform of claim 1, wherein the first switch and second switch comprise a heterogeneous mix of networking switches.

4. The platform of claim 1, further comprising a memory map of the system memory stored in the memory elements of the first switch and the second switch.

5. The platform of claim 1, wherein at least one of the executable portions comprises machine code executable by the first processing core.

6. The platform of claim 1, wherein the first switch is configured to execute on its multi-core processor at least two different executable portions of the software application.

7. The platform of claim 6, wherein the first switch is configured to execute on its multi-core processor at least three different executable portions of the software application.

8. The platform of claim 1, wherein at least two of the executable portions are mirrored portions, which configures the first and second processing cores to concurrently execute the mirrored portions.

9. The platform of claim 8, wherein the first processing core is configured to continue executing one of the mirrored portions upon loss of connectivity between the system memory and the second processing core.

10. The platform of claim 1, wherein at least two of the executable portions are different and comprise overlapping code segments.

11. The platform of claim 1, wherein the first and the second processing cores are configured to store results of execution of their respective executable portions in the system memory over the network.

12. The platform of claim 1, wherein the first processing cores is capable of executing its assigned executable portion while the first switch forwards packets from the first device to the second device.

13. The platform of claim 1, further comprising a first segment and a second segment partitioned from the system memory, where the first and the second segments are for exclusive use by the first and the second processing cores, respectively.

14. The platform of claim 1, wherein the networking switches form a distributed core fabric.

15. The platform of claim 1, wherein at least one of the first and the second devices is configured to store the software application in the system memory.

* * * * *